R. C. McFALL.
STRAW, CHAFF, AND HAY LOADER.
APPLICATION FILED OCT. 30, 1918.
1,366,270.
Patented Jan. 18, 1921.
2 SHEETS—SHEET 1.
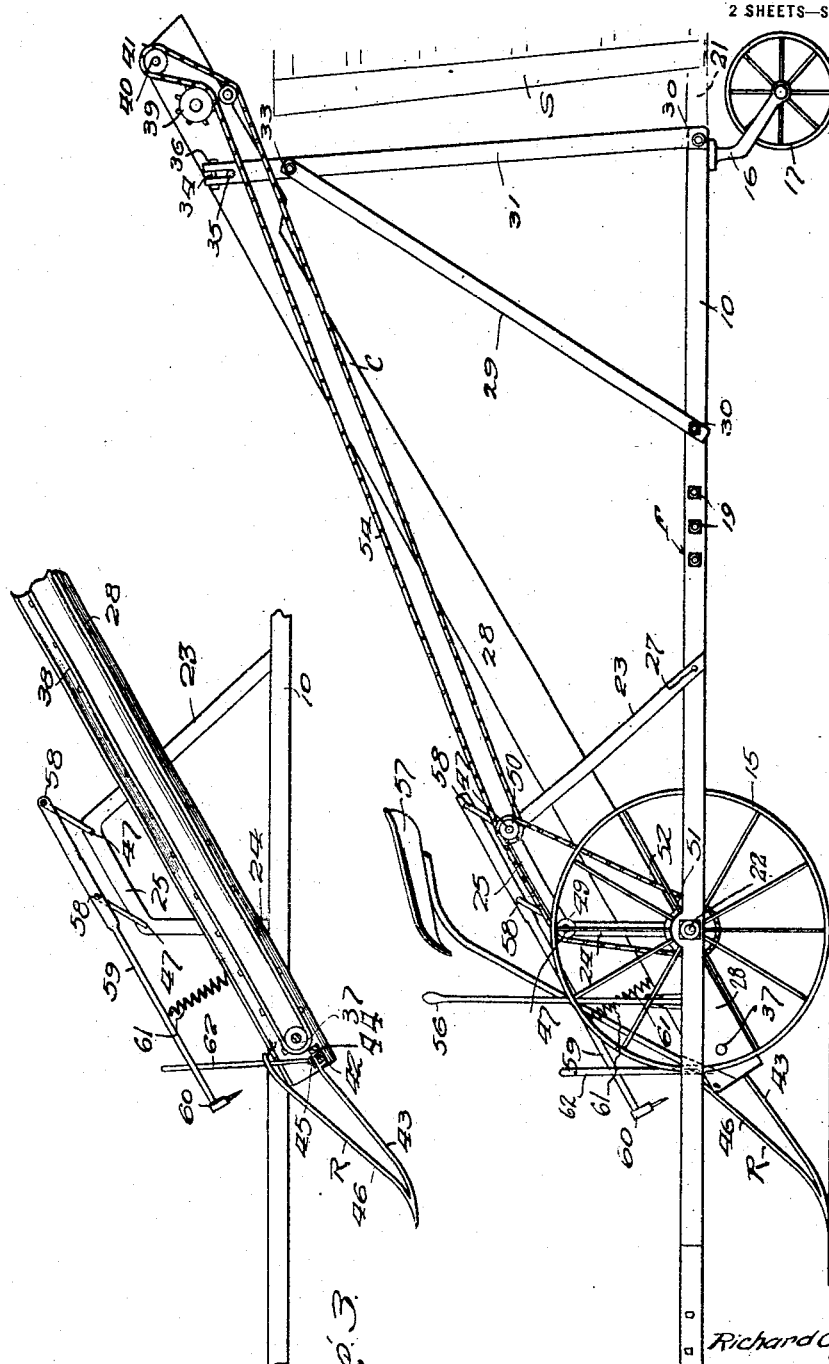
Richard C. McFall
Inventor
By Geo. P. Kimmel
Attorney R. C. McFALL.
STRAW, CHAFF, AND HAY LOADER.
APPLICATION FILED OCT. 30, 1918.
1,366,270.
Patented Jan. 18, 1921.
2 SHEETS—SHEET 2.
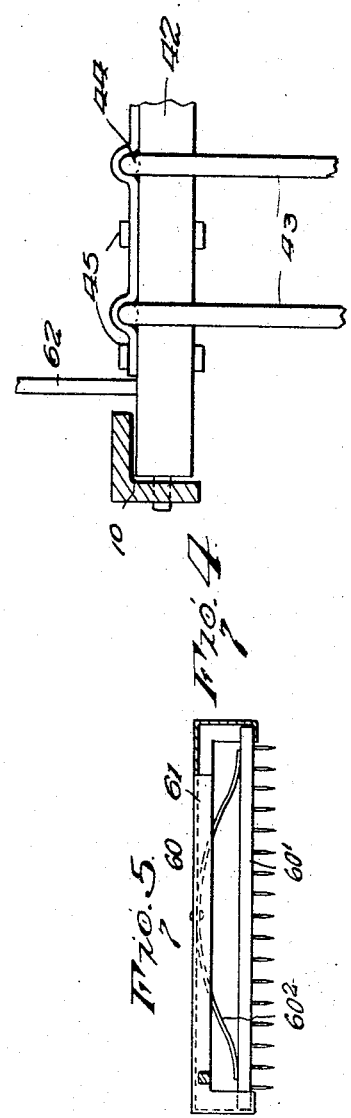
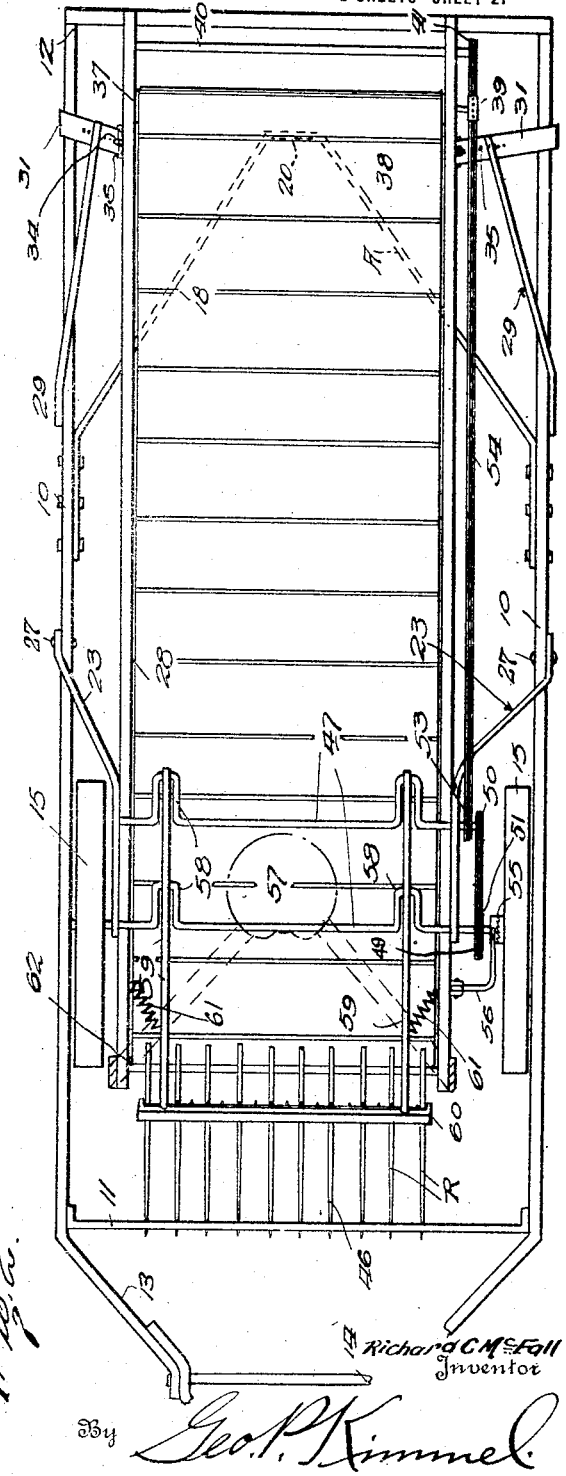

UNITED STATES PATENT OFFICE.

RICHARD C. McFALL, OF HARTLINE, WASHINGTON.

STRAW, CHAFF, AND HAY LOADER.

1,366,270.  Specification of Letters Patent.  Patented Jan. 18, 1921.

Application filed October 30, 1918. Serial No. 260,321.

*To all whom it may concern:*

Be it known that I, RICHARD C. McFALL, a citizen of the United States, residing at Hartline, in the county of Grant and State of Washington, have invented certain new and useful Improvements in Straw, Chaff, and Hay Loaders, of which the following is a specification.

This invention relates to the class of farm machinery, and more particularly to an improved device for raking or collecting straw, chaff and hay and loading the same onto a straw rack or wagon in a continuous operation, and so effecting the same amount of work with the machine and two men, as would be accomplished ordinarily by six men, the work being accomplished easier and quicker, and the machine being designed to operate in rear of a harvester as will be understood.

A still further object of the invention is to provide a loader of the class described provided with means for raking or gathering the hay, chaff or straw as the machine is advanced across a field over the shocks of standing grain or the like, the draft means or animals straddling or running on either side of the piles and the machine being so constructed as to be adjusted for the best loading operation and including a sweep rake and an endless conveyer with means for drawing the straw or the like from the sweep rake over the conveyer whose parts are mounted upon a wheeled frame designed to have attached to the rear portion thereof, a straw wagon into which the straw or the like is discharged.

A further object of the invention is to provide a loader of the class described in which the operative parts are capable of control by an operator disposed above the front carrying frame, the conveyer being also capable of adjustment vertically and adapted to compensate for the variances in the ground level, so that the loader and the straw wagon will have relative movement to prevent interference with the loading operation or injury to the loader or wagon, and also to permit raising of the sweep rake by lowering of the rear portion of the conveyer to facilitate the transportation or carriage of the machine from place to place, that is along a road, or from one field to another.

With the above objects and others in view as will appear as the description proceeds, the invention comprises the novel features of construction, combinations of elements and arrangement of parts which will be more fully described in the following specification and then finally embodied in the clauses of the claim which are appended hereto and which form an essential part of the same.

Reference is had to the accompanying drawings forming a part of this application, wherein similar reference characters will refer to corresponding parts throughout the several views, in which—

Figure 1 is a side elevation of my improved straw, chaff and hay loader,

Fig. 2 is a plan view thereof,

Fig. 3 is a detailed sectional view of the raking and loading mechanism, and

Fig. 4 is a transverse section.

Fig. 5 is an enlarged detail, partly in section, of the head portion of the rotating rake.

Referring to the drawings in detail, my improved straw, chaff and hay loader is shown as comprising a frame F consisting of side bars 10 and end bars or cross braces 11 and 12 at the front and rear ends thereof, thereby producing a rigid rectangular frame. The forward portions of the side bars 10 are extended as shown at 13, in convergent relation for the attachment of suitable draft means 14, for a double team, tractor or other suitable means designed to exert pull thereon, for advancing the machine across a field over the standing shocks of grain, straw or other material to be collected and loaded.

The front transporting or carrying wheels constituting bull wheels of the machine, are designated 15, being journaled on the front axle at the forward portions of the side bars 10, while at the rear ends thereof, are provided forks 16 turnable and carrying caster wheels 17, to support the load at the rear of the frame and also facilitate turning of the machine. A straw wagon designated in part by the letter S, is designed to be attached to the rear of the machine through the medium of a draft attaching frame including sides 18 disposed in V-like shape or converging rearwardly and having the side portions at the forward ends thereof bolted to the side beams 10, as shown. The rear or bight portion 20 is adapted to be connected to the draft tongue 21 of the straw wagon of the loader, it being observed that the tongue 21 is relatively short, so that the straw wagon will be properly positioned relative to the loading mechanism, as will be hereinafter more particularly pointed out.

The front axle is designated 22 and associated with the same and with each side bar 10 and extending rearwardly of the axle, is a side frame 23 having vertical portions 24 and inclined top portions 25, the rear portions 23 extending from said top portions and being bolted or otherwise secured to the side bars 10, as shown at 27 forwardly of the connecting means 19 of the draft frame 18. The axle 22 supports an endless conveyer or draper frame, the side portions 28 of which are obliquely disposed and pivoted on the axle 22 to extend slightly forwardly thereof and rearwardly over the straw wagon. The frames 23 are substantially of diamond shape outline and receive the conveyer frame therebetween, while the rear portion of the frame is supported upon upwardly converging side frames 31 secured to the sides 10 at the rear ends thereof. The frame members 31 are supported by diagonal braces 29, the lower ends of the braces being pivoted at 30 to the frame members 10 and at 33 to the frame members 31. The upper ends of the portions 31 are slotted to provide open bearings 34 to receive a supporting and retaining pivot 35 of the conveyer frame therein and permitting the same to be removed for lowering the conveyer frame, through the medium of detachable bolt connections 36 spanning said groove or bearings as clearly shown.

In this manner, the conveyer frame is supported in a forwardly inclined position, the rear portion of the frame projecting beyond the loader and over the straw rack or wagon sufficiently to compensate for variances in the road surface or uneven portions of the ground, so that the two can move upwardly and downwardly relatively without striking or injuring one or the other. At each end of the conveyer frame there is a shaft and corresponding rollers 37 around which is trained an endless belt or draper 38, the upper roller bearing a drive sprocket 39 at one or both sides. There is also provided rearwardly of the rear roller, a transverse shaft 40 carrying a sprocket wheel 41 outwardly of the frame at one or both ends for a purpose as will be hereinafter made apparent.

At the forward portion of the conveyer frame, there is provided a transverse bar 42 carrying the sweep or gathering rake generally indicated by the letter R and comprising a plurality of tine portions 43 having angular end portions 44 bolted or otherwise secured to the pivoted bar 42 as indicated at 45, said fastening means passing vertically through said bar below the draper or conveyer. There are also provided tine portions 46 branching upwardly and rearwardly from the portions 43 and extending over the draper or conveyer belt, so as to discharge the straw, chaff or hay on to the latter. Rotatable in the frames 23 at the forward and rear extremities of the top portions 25 thereof, are shafts 47 carrying sprocket wheels 49 and 50 around which and a sprocket wheel 51 fixed to the axle 22, an endless drive chain 52 is engaged, so as to impart rotation to the shafts 47 as the machine is advanced across a field. A sprocket wheel 53 is also fixed to the rear shaft 47 and has engaged around the same an endless drive belt 54 which also engages around the sprocket wheel 41 serving as an idler in back of the upper roller, the upper lap of the drive chain 54 as well as the lower lap passing under the sprocket wheel 39 so as to impart rotation in a proper direction to the endless belt or draper. It is to be understood that by the term endless chain, I mean any endless drive member or belt, as is common in the art.

Clutch means 55 are provided for engaging and disengaging the sprocket wheel 51, the same being under control by the operator through the medium of a lever 56 in convenient position from the driver's seat 57, arranged over the front axle. The shafts 47 are provided with crank portions 58 connected by rods 59 with a rake 60 transversely positioned over the conveyer belt or draper and having the tines thereof operating between the teeth of the sweep rake R. Thus, as the rake is advanced along to gather the straw, the rake 60 will be actuated to a substantially rotary movement, so as to drag or draw the straw, chaff or hay back onto the conveyer by means of which it is conveyed rearwardly and discharged rearwardly into the hay rake or wagon. The rotatively operating sake designated as a whole at 60, comprises a support 61, preferably of channel metal, having downturned ends providing guide channels closed at their lower ends, as indicated in Fig. 5, with the head proper 60', of the rake operating in the guides and held yieldably in position by a spring $60^2$ to normally maintain the same in a position to engage matter or objects being handled by the machine.

In the operation of the device, it will be seen that by reason of the mounting of the rake as specified, the rake teeth will not bind on the sweep rake as the straw, chaff or hay is gathered and as the machine is moved over the straw piles or shocks, up one row and down the other, the straw and the like will be gathered by the rake and caused to slide up the same, being caught by the oscillating rake and discharged onto the conveyer, from which it is carried to the rear of the machine and dumped into the straw rack or wagon. The gathering rake may be raised and lowered through the medium of a throw lever 62 so as to vary the action thereof and avoid projections or obstacles on the ground such as stones or the like. The draper frame C preferably has a throw of about two feet, and as the rear of the conveyer is held supported so as to be detached and lowered from the supporting frames at the rear of the machine, said frames being in the form of standards, the forward portion of the conveyer will be elevated together with the sweep rake, said sweep rake having the tines thereof arranged about twenty inches from the ground, so as to facilitate traveling on a road or from one field to another. The discharge end of the elevator is somewhat higher than the receiving end of the wagon or rack S, and the coupling 21 being necessarily flexible, the wheeled frame of the receiving vehicle can independently rise and fall in running over uneven ground without disarranging any of the parts or interfering with their coactive operation, and said parts will automatically assume a proper relative position or level when level ground is reached.

From the foregoing description taken in connection with the accompanying drawings, it is thought that a clear and comprehensive understanding of the construction, operation and advantages of this invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

1. In a straw, chaff and hay loader, a wheeled frame, drive wheels at the forward portion of the frame, supporting and steering wheels at the rear portion of the frame, an endless conveyer having a frame pivoted on the front axle, standards at the sides of the rear portion of the frame to adjustably support the rear of the conveyer frame to permit upward movement thereof relative to the standards, a rake at the forward portion of the conveyer frame mounted for manual adjustment and depending to the ground surface, side frames at the forward portion of the wheeled frame, a second rake operating over said first rake, springs for holding said second rake toward said first rake, coöperative means to rotate said second rake and actuate the conveyer, and means for raising and lowering the first rake.

2. In a straw, chaff and hay loader, a wheeled frame, drive wheels at the forward portion of the frame, supporting and steering wheels at the rear portion of the frame, an endless conveyer having a frame pivoted on the front axle, standards at the sides of the rear portion of the wheeled frame to adjustably support the rear of the conveyer frame to permit upward movement thereof relative to the standards, a rake at the forward portion of the conveyer frame depending to the ground surface, and mounted for swinging manual adjustment, side frames at the forward portion of the wheeled frame, a second rake operating over said first mentioned rake, means for actuating said second rake to cause it to coöperate with said first mentioned rake, shafts journaled in said side frames at the front portion of the wheeled frame, said shafts having crank portions connected to the second rake to impart rotary motion to the same, drive connections between said front wheels and the shafts, drive connections associated with the shaft for driving the conveyer, means capable of controlling the operation of said drive mechanism, and means for raising and lowering the first named rake.

3. In a straw, chaff and hay loader, a wheeled frame, an endless inclined conveyer having a frame pivoted to the front axle of the wheeled frame, a rake at the forward portion of the conveyer frame depending to the ground surface and mounted for manual adjustment, the teeth of the rake having lower attached portions and upper free portions diverging from the tines thereof, side frames at the forward portion of the wheeled frame, a second rake operating over the first rake, springs for holding the second rake toward the first rake, shafts journaled in said side frames, crank portions on the shafts connected with the second named rake for imparting rotary movement thereto to transfer the gathered straw and hay from the first named rake to the conveyer, drive connections between the wheels of the frame and the shafts, drive connections associated therewith for actuating the conveyer, means for controlling the operation of the drive means, and means for raising or lowering the first named rake to avoid obstructions on the ground.

In testimony whereof I affix my signature hereto.

RICHARD C. McFALL.